US010688809B2

(12) United States Patent
Condello et al.

(10) Patent No.: US 10,688,809 B2
(45) Date of Patent: Jun. 23, 2020

(54) SYSTEM AND METHOD FOR DETECTING DEFECTIVE ULTRAVIOLET RADIATING LIGHT EMITTING DIODES IN A PRINTER

(71) Applicant: Xerox Corporation, Norwalk, CT (US)

(72) Inventors: Anthony S. Condello, Webster, NY (US); Jack T. LeStrange, Macedon, NY (US); Xin Yang, Webster, NY (US); Mandakini Kanungo, Penfield, NY (US); Peter J. Knausdorf, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/037,312

(22) Filed: Jul. 17, 2018

(65) Prior Publication Data

US 2018/0345683 A1    Dec. 6, 2018

Related U.S. Application Data

(63) Continuation of application No. 15/610,779, filed on Jun. 1, 2017, now Pat. No. 10,052,888.

(51) Int. Cl.
| | |
|---|---|
| *B41J 11/00* | (2006.01) |
| *B41J 11/22* | (2006.01) |
| *B41J 15/08* | (2006.01) |
| *B41J 15/10* | (2006.01) |
| *B41J 15/12* | (2006.01) |
| *B41J 15/14* | (2006.01) |
| *G01J 1/06* | (2006.01) |
| *G01J 1/42* | (2006.01) |

(52) U.S. Cl.
CPC .............. *B41J 11/002* (2013.01); *G01J 1/06* (2013.01); *G01J 1/429* (2013.01); *G01J 2001/4252* (2013.01)

(58) Field of Classification Search
CPC . B41J 11/22; B41J 11/002; B41J 15/08; B41J 15/10; B41J 15/12; B41J 15/14
See application file for complete search history.

(56) References Cited

U.S. PATENT DOCUMENTS

| | | |
|---|---|---|
| 7,264,346 B2 | 9/2007 | Nishino et al. |
| 7,649,648 B2 | 1/2010 | Lapstun et al. |
| 8,783,818 B2 | 7/2014 | Yamada et al. |
| 2004/0179079 A1 | 9/2004 | Yokoyama |
| 2005/0168509 A1 | 8/2005 | Yokoyama |

(Continued)

*Primary Examiner* — Jason S Uhlenhake
(74) *Attorney, Agent, or Firm* — Maginot Moore & Beck LLP

(57) ABSTRACT

A printer includes an ultraviolet (UV) curing device having UV light emitting diodes (LEDs) to cure UV curable inks ejected onto a surface after the surface travels past a plurality of printheads in the printer. A UV detector having UV sensors is positioned opposite the UV curing device so the UV sensors and UV LEDs are opposite one another in a one-to-one correspondence. A controller operates the UV curing device to direct UV light into the UV detector and receives electrical signals generated by the UV sensors. The controller compares these electrical signals to a predetermined threshold to identify defective LEDs in the UV curing device. The controller then determines how to move the UV curing device across the path of the surface to irradiate areas of the surface previously opposite the defective UV LEDs.

15 Claims, 8 Drawing Sheets

(56) References Cited

U.S. PATENT DOCUMENTS

| | | |
|---|---|---|
| 2005/0168555 A1 | 8/2005 | Niekawa |
| 2008/0079795 A1 | 4/2008 | Nakazawa |
| 2008/0174648 A1 | 7/2008 | Nakano et al. |
| 2010/0225720 A1* | 9/2010 | Ishida .................. B41J 3/28 347/102 |
| 2012/0139993 A1* | 6/2012 | Yamada ............... B41J 11/002 347/19 |
| 2014/0002530 A1 | 1/2014 | Thompson |
| 2015/0062271 A1* | 3/2015 | Kremers ............... B41J 29/13 347/102 |
| 2016/0144570 A1 | 5/2016 | Kim et al. |
| 2016/0273833 A1 | 9/2016 | Haile et al. |

* cited by examiner

US 10,688,809 B2

SYSTEM AND METHOD FOR DETECTING DEFECTIVE ULTRAVIOLET RADIATING LIGHT EMITTING DIODES IN A PRINTER

PRIORITY CLAIM

This application is a divisional application of pending U.S. patent application Ser. No. 15/610,779, which is entitled "System And Method For Detecting Defective Ultraviolet Radiating Light Emitting Diodes In A Printer," which was filed on Jun. 1, 2017, and which issued as U.S. Pat. No. 10,052,888 on Aug. 21, 2018.

TECHNICAL FIELD

This disclosure relates generally to a system for printing on three-dimensional (3D) objects, and more particularly, to systems that print on objects with ultraviolet (UV) curable inks.

BACKGROUND

Commercial article printing typically occurs during the production of the article. For example, ball skins are printed with patterns or logos prior to the ball being completed and inflated. Consequently, a non-production establishment, such as a distribution site or retail store, for example, in a region in which potential product customers support multiple professional or collegiate teams, needs to keep an inventory of products bearing the logos of various teams popular in the area. Ordering the correct number of products for each different logo to maintain the inventory can be problematic.

One way to address these issues in non-production outlets is to keep unprinted versions of the products, and print the patterns or logos on them at the distribution site or retail store. Printers known as direct-to-object (DTO) printers have been developed for printing individual objects. Some of these printers use UV curable inks to form ink images on the objects. UV curable inks require a UV radiation source that directs UV light onto the inks on the object surface. This light cures the inks and helps eliminate vapors that otherwise emanate from the inks. Some of these vapors can be noxious to humans.

UV radiating light emitting diodes (LEDs) are one efficient form of UV radiation sources. These semiconductor devices generate light in the UV range of the light spectrum in response to a DC voltage being applied to the semiconductor junction in the device. Typically, these UV LEDs are arranged in an array of LEDs that extend in the cross-process direction, which is perpendicular to the path of movement for the holder and the object passing by one or more printheads for ink printing. As used in this document, "process direction" refers the direction of movement of an object past the printheads in a printer and "cross-process direction" refers to an axis that is perpendicular to the process direction in a plane parallel to the plane in which the holder of the object is moving. Over the operational life of the UV LEDs, some of the LEDs begin producing radiation at lower levels until they no longer emit an UV light with an effective intensity for curing UV inks. Detecting this demise of UV LEDs in a printer prior to them becoming completely ineffective for UV ink curing would be beneficial.

SUMMARY

A new printing system includes a detector configured to identify defective UV LEDs in a printer that ejects UV curable inks to form ink images. The printing system includes a plurality of printheads, each printhead in the plurality of printheads being configured to eject marking material, an ultraviolet (UV) curing device having a plurality of UV light emitting diodes (LEDs), each UV LED in the UV curing device being configured to emit UV light, the UV curing device being positioned to cure UV marking material after at least one of the printheads has ejected UV marking material onto a surface, an UV detector having a plurality of UV sensors, each UV sensor being configured to receive UV light from one of the UV LEDs in the UV detector and generate an electrical signal corresponding to an intensity of the UV light received by the UV sensor, and a controller operatively connected to the plurality of printheads, the UV curing device, and the UV detector. The controller is configured to operate the UV curing device to direct UV light into the UV detector, to receive the electrical signals generated by the UV sensors in the UV detector, and to identify any UV LED in the UV curing device that is not emitting UV light at a predetermined intensity or greater.

A method of operating a printer having a detector configured to identify defective UV LEDs helps ensure that UV curable ink images are properly cured before the image exits the printer. The method includes operating an ultraviolet (UV) curing device with a controller to direct UV light into a UV detector, the UV curing device having a plurality of UV light emitting diodes (LEDs) and the UV detector having a plurality of UV sensors, each UV LED in the UV curing device being configured to emit UV light and each UV sensor being configured to receive UV light from one of the UV LEDs in the UV curing device and generate an electrical signal corresponding to an intensity of the UV light received by the UV sensor, receiving with the controller electrical signals generated by the UV sensors in the UV detector, and identifying with the controller any UV LED in the UV curing device that is not emitting UV light at a predetermined intensity or greater.

BRIEF DESCRIPTION OF THE DRAWINGS

The foregoing aspects and other features of a printing system that identifies defective UV LEDs in the printer are explained in the following description, taken in connection with the accompanying drawings.

DETAILED DESCRIPTION

Figure 1A:
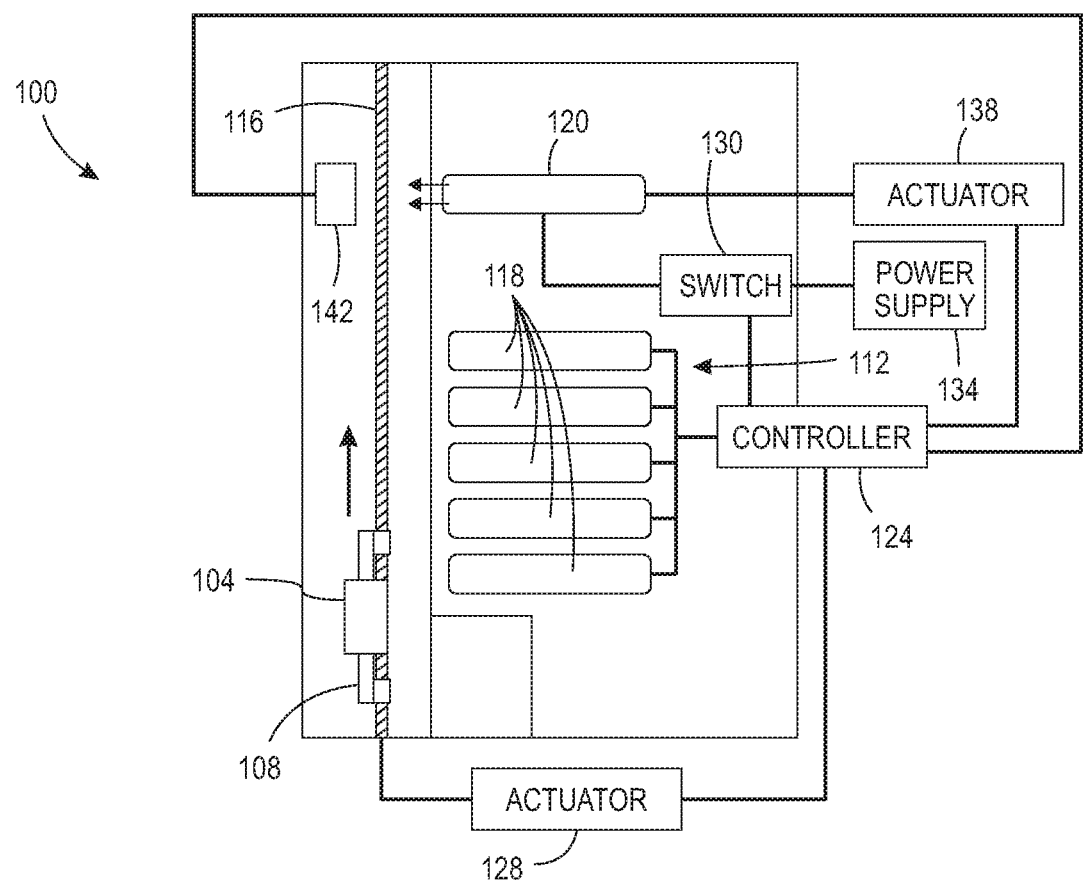
FIG. 1A is a schematic diagram of a side view of a printing system having a detector that identifies defective UV LEDs in an array of UV LEDs in the printer.

For a general understanding of the present embodiments, reference is made to the drawings. In the drawings, like reference numerals have been used throughout to designate like elements.

FIG. 1 depicts a printing system 100 configured to print the surface of an object 104 mounted to a holder 108 as the holder 108 moves in a process direction indicated by the arrow on a member 116 past an array of printheads 112. If one or more of the printheads 118 in the array 112 ejects ultraviolet (UV) ink, then the UV curing device 120 is operated by controller 124 to cure the UV ink. The controller 124 is also configured to operate the actuator 128 to move the holder 108 along the member 116 after the object is mounted into the holder. Controller 124 is configured to operate the printheads 118 in the array 112 to eject marking material onto the surface of the object 104. An electrical switch 130 is operatively connected between power supply 134 and the UV curing device 120. Controller 124 is operatively connected to the switch 130 to couple the power supply 134 to the UV curing device 120 selectively. The controller 124 operates the actuator 138 to move the UV curing device 120 in a cross-process direction that is orthogonal to the process direction of the holder 108 as described more fully below. A UV detector 142 is positioned opposite the UV curing device 120 to receive UV radiation from the device 120 when no object 104 or holder 108 intervenes between the detector 142 and the device 120. As used in this document, "UV light" refers to light having a wavelength that is shorter than visible light, but longer than X-rays. Light is this range has a wavelength of about 10 nm to about 400 nm.

Figure 1B:
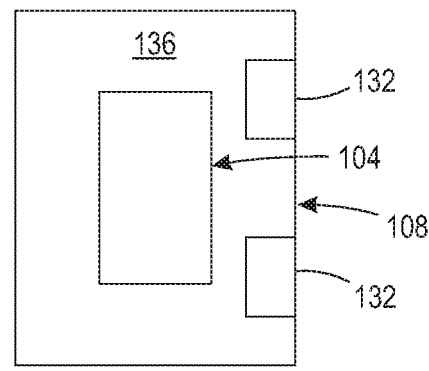
FIG. 1B is a frontal perspective of the holder in the system of FIG. 1A.

One embodiment of the holder 108, which is known in the prior art, is shown in FIG. 1B. Holder 108 includes a pair of sleeves 132 that receive the member 116 and a platen 136. This configuration offsets the platen 136 of the holder 108 from the member 116. The printheads 118 are offset in the cross-process direction from the longitudinal axis of the member 116 to enable the printheads to eject ink towards the object held in the holder 108. Likewise, the UV curing device 120 and the UV detector 142 are offset in the cross-process direction to enable the UV curing device to direct UV light toward the ink image on the object 104 to cure UV curable ink on the object. Since the UV detector is also offset in the cross-process direction opposite the UV curing device, it can receive UV light from the UV sensors in the UV curing device when the holder 108 is not interposed between the UV curing device and the UV detector as explained in more detail below.

Figure 2A:
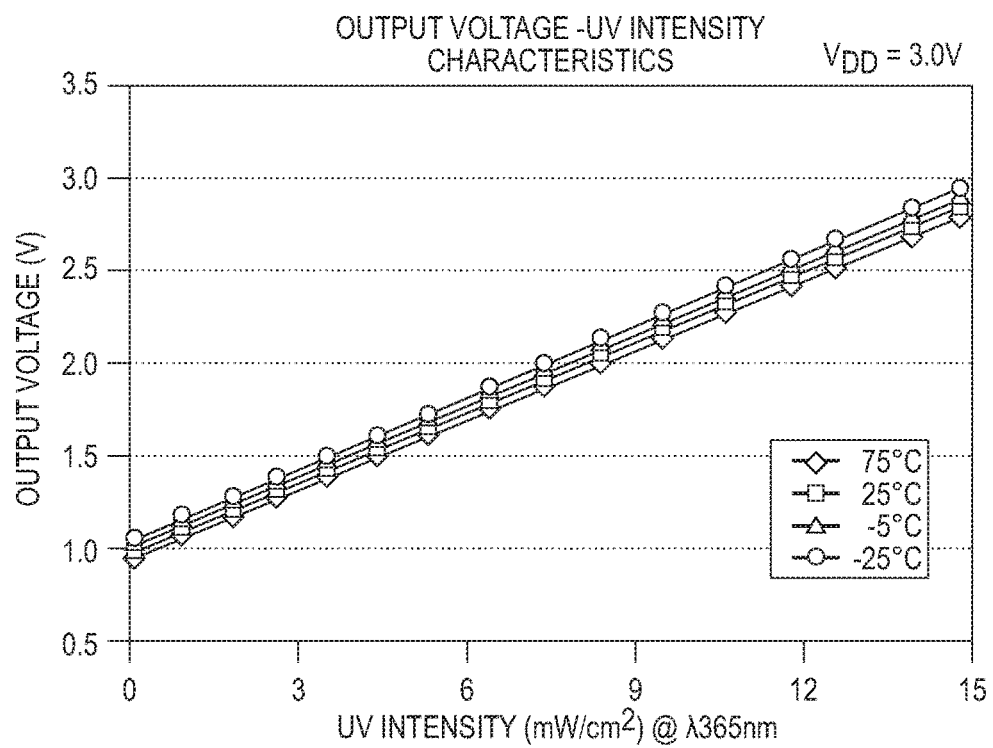
FIG. 2A is a graph illustrating the response of a UV sensor to an increasing intensity of UV radiation at various temperatures and FIG. 2B is a graph illustrating the spectral responsivity of the UV sensor.
Figure 2B:
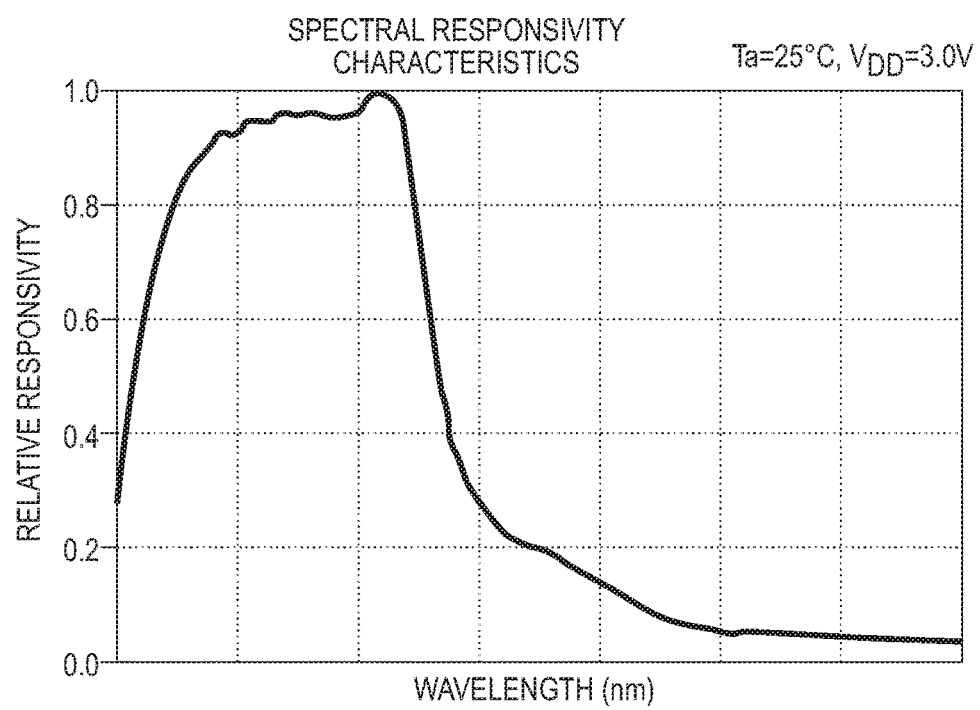

FIG. 2A is a graph that shows the output voltage level of a UV sensor in UV detector 142 with reference to the intensity of the UV light being received by the sensor. As the UV radiation intensity increases, the output voltage of the UV sensor increases linearly. This relationship is approximately the same for each of the temperatures shown in the figure. FIG. 2B is a graph that shows the spectral responsivity of the same sensor.

Figure 3:
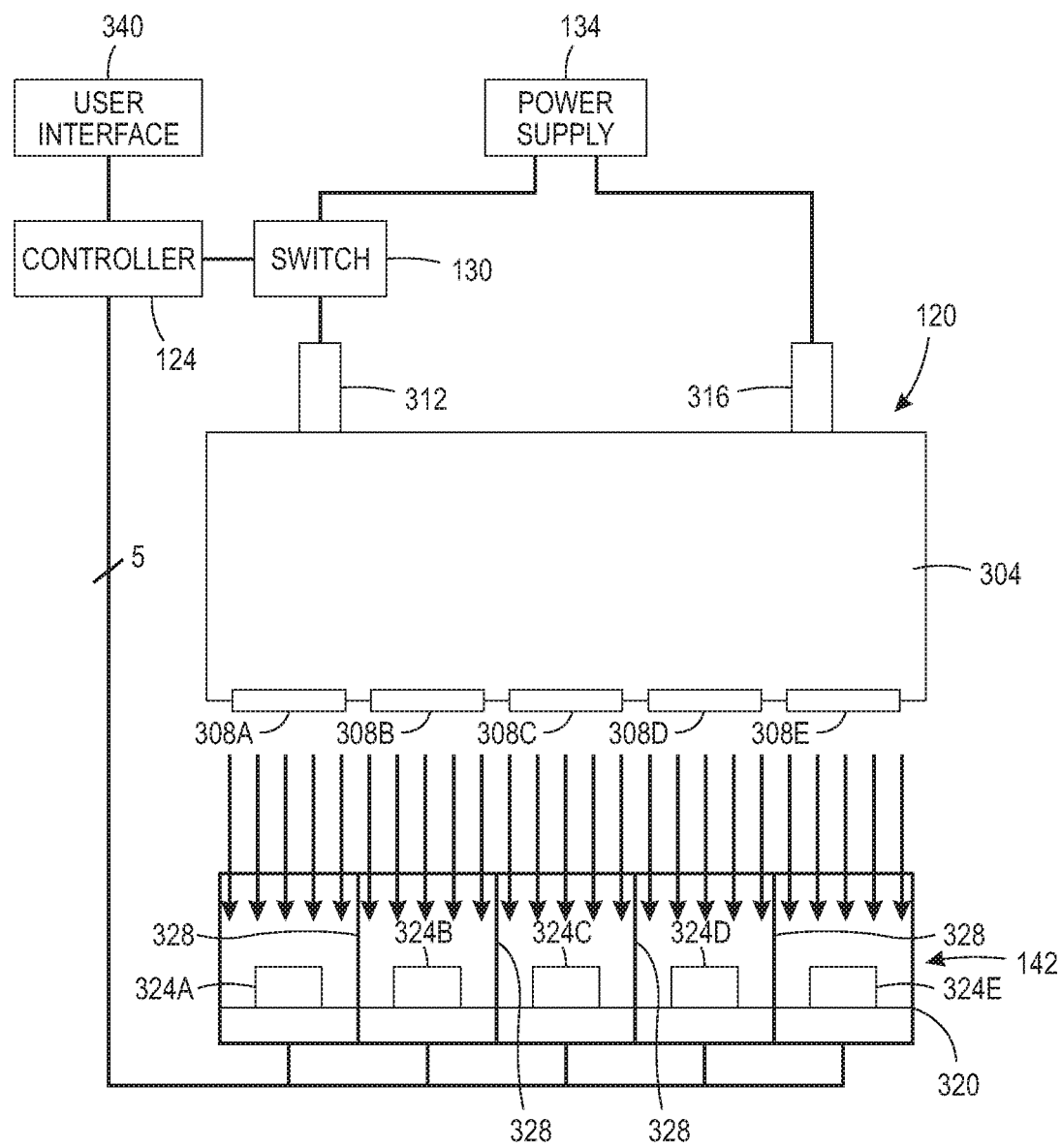
FIG. 3 is a block diagram that illustrates the structure of the UV LED array and the structure of the UV sensor for detecting defective UV LEDs.

FIG. 3 is a block diagram that illustrates the structure of the UV LED array in the UV curing device 120 and the structure of the UV detector 142 for identifying defective UV LEDs in the UV curing device. The curing device 120 includes a housing 304 and an array of UV LEDs 308A to 308E. The LEDs 308A to 308E are electrically connected to the input voltage connection 312 and the return connection 316 so the UV LEDs of the curing device 120 can be coupled to the power supply 134. The input voltage connection 312 is connected to the output of the voltage supply 134 through switch 130, which is operated by the controller 124 to couple the voltage supply 134 to the LEDs in the curing device 120 selectively. While the figure depicts five LEDs 308A to 308E, the number of LEDs is a number that enables the LEDs to form a continuous line of UV radiation that extends across the path of the holder 108 in the cross-process direction for a distance that corresponds to the width of the widest object that the holder 108 can accommodate.

With continued reference to FIG. 3, the UV detector 142 includes a housing 320 in which an array of UV sensors 324A to 324E are arranged in the cross-process direction in a one-to-one correspondence with the UV LEDs 308A to 308E. Between adjacent UV sensors are solid partitions 328. These partitions help shield each UV sensor from UV radiation produced by UV LEDs that are not directly opposite a particular UV sensor. This configuration helps ensure that each UV sensor corresponds to the UV LED in the curing device 120 that is directly opposite the UV sensor. The outputs of the UV sensors 324A to 324E are output to the controller 124 to enable the controller to identify any defective UV LEDs with reference to the output signals while the UV LEDs 308A to 308E of the UV curing device 120 are being operated to direct UV light into the UV sensors 324A to 324E, respectively, of the UV detector 142. The controller 124 compares those signals to a predetermined threshold to determine whether to identify any of the LEDs as being defective. In one embodiment, the UV sensors are Part Number ML8511 manufactured by SparkFun Electronics of Niwot, Colo., although other suitable UV sensors can be used. An user interface 340 is operatively connected to the controller 124 to enable the controller to generate indications for servicing of the UV curing device 120 as explained in more detail below.

Figure 4:
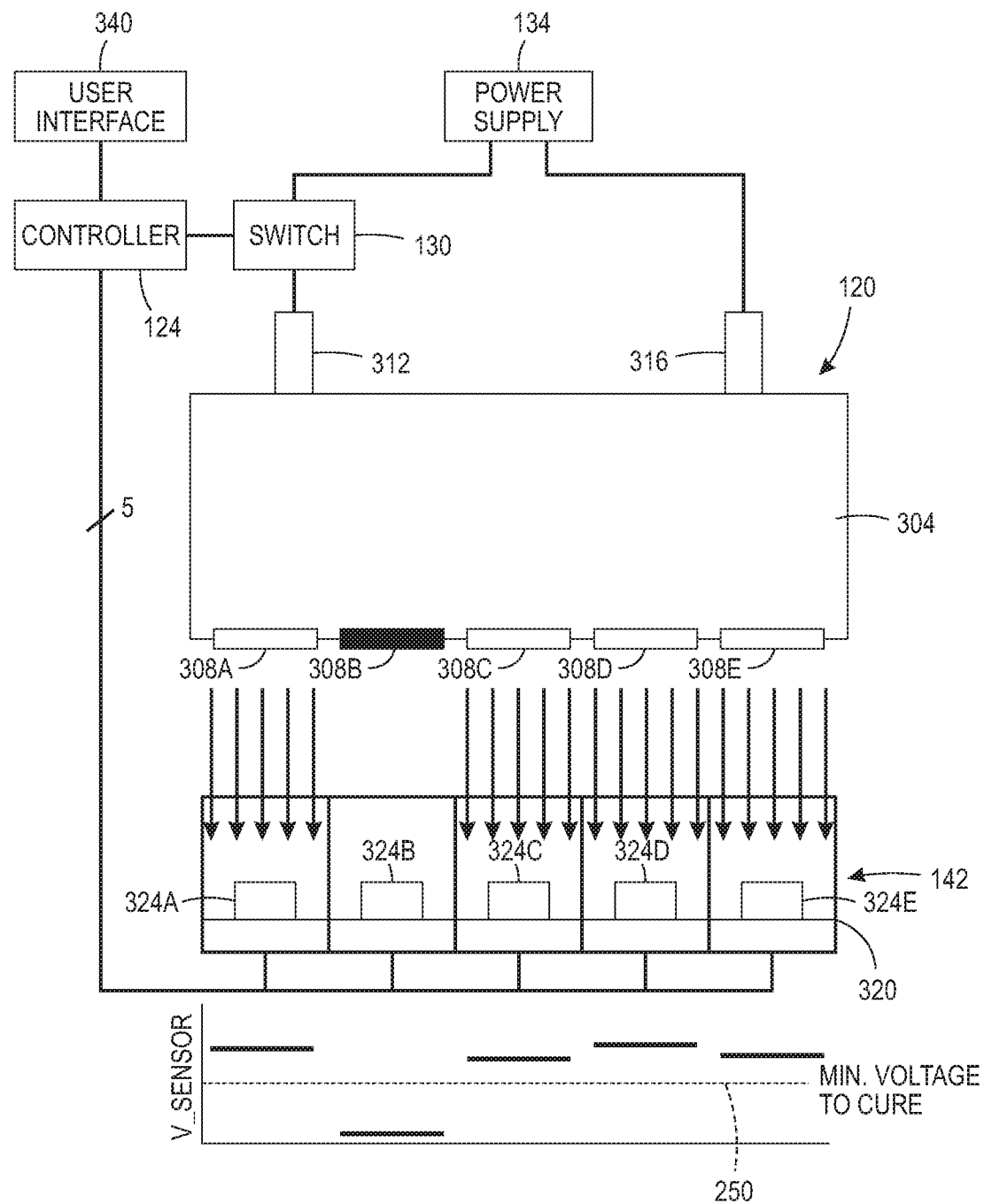
FIG. 4 is a block diagram illustrates a defective UV LED in the array of FIG. 3 and the responses of the UV detectors in the UV sensor of FIG. 3.

FIG. 4 is a block diagram that illustrates a defective UV LED in the array of LEDs 308A to 308E and the responses of the UV sensors 324A to 324E in the UV detector. As shown in the figure, UV LED 308B of the curing device 120 is not producing any UV light as indicated by the absence of arrows proceeding from that LED. Consequently, the UV sensor 324B opposite UV LED 308B generates an output voltage level that is less than the threshold 250, which corresponds to the minimum UV intensity adequate to cure UV ink on an object. The remaining UV LEDs 308A and 308C to 308E generate a sufficient amount of UV radiation that the output voltages generated by the remaining UV sensors are above the threshold. Therefore, the controller 124 identifies UV LED 308B in the UV curing device 120 as being the only defective LED in the device 120.

Figure 5:
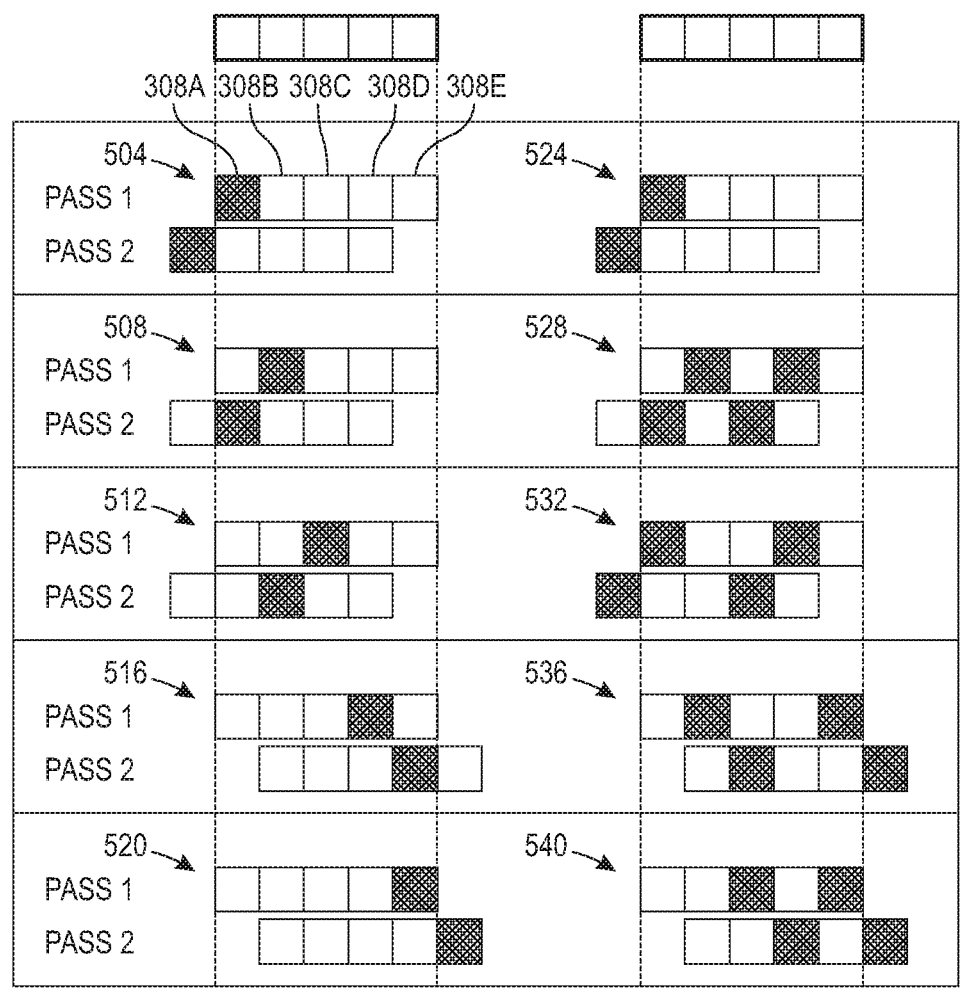
FIG. 5 depicts an adjustment of the UV curing operation that addresses the detection of defective UV LEDs.

Once a defective UV LED has been detected by the controller 124 from the signals generated by the UV sensors 324A to 324E in the UV detector 142, adjustments to the placement of the UV curing device 120 can be made to enable the printer 100 to continue operation without replacing the defective LED. FIG. 5 illustrates such an adjustment of the UV curing operation that addresses the detection of defective UV LEDs. In the figure, ten different scenarios of UV LED failure 504, 508, 512, 516, 520, 524, 528, 532, 536, and 540 are depicted. In scenario 504, the UV LEDs are identified by the reference numbers used above, namely, 308A to 308E. These references numbers also apply to the UV LEDs in the other scenarios shown in FIG. 5. In scenario 504, UV LED 308A is identified as being defective. To address this situation, the controller 124 operates the actuator 128 to pass the holder 108 and object 104 past the UV curing device 120 in a first pass to enable UV LEDs 308B to 308E to cure UV ink on the object. The controller 124 then operates actuator 138 to move the UV curing device 120 left in the cross-process direction by the width of one UV LED radiation pattern and then operates actuator 128 to move the holder 108 and object 104 through the line of UV radiation generated by the repositioned curing device 120. This repositioning enables LED 308B to replace the defective LED 308A and radiate the UV ink during its second pass by the curing device. The scenarios 508, 512, 516, and 520 are scenarios in which only one UV LED is identified as being defective. In each of these scenarios, the controller 124 operates the actuators 128 and 138 in a similar manner to the one described with reference to scenario 504 to pass the holder 108 and the object 104 by the UV curing device 120 twice and to reposition the UV curing device by a distance corresponding to the width of one UV LED radiation pattern between the two passes to enable an uncured area on the object 104 to be cured by an operational UV LED in the device 120. Other possible repositioning moves can achieve the same objective.

In scenarios 524, 528, 532, 536, and 540, two LEDs in the curing device 120 have been identified as being defective. Again, in response to the detection of the defective LEDs, the controller 124 operates the actuators 128 and 138 in a similar manner to the one described with reference to scenario 504 to pass the holder 108 and the object 104 by the UV curing device 120 twice and to reposition the UV curing device by a distance corresponding to the width of one UV LED radiation pattern between the two passes to enable both uncured areas on the object 104 to be cured by two operational UV LEDs in the device 120. Other possible repositioning moves can achieve the same objective.

While multiple repositioning of the curing device 120 combined with more than two passes can be used to address other defective LED scenarios, they be deemed too inefficient to be implemented. For example, if both LED 308A and LED 308E are identified as being defective, then a remedial solution would require three passes and two cross-process direction movements for the repositioning of the curing device. In such a scenario, one repositioning moves the device 120 by the distance of one radiation pattern in either the right or left direction to cure the area left uncured by the defective rightmost or leftmost defective LED, respectively. To then address the remaining uncured area, the curing device is moved in the opposite direction along the cross-process axis by a distance corresponding to two radiation pattern widths. These multiple passes and reposition actions may consume an amount of time that renders printing and curing of the images on objects inefficient. Instead, the controller 124 could generate a signal to a user interface 340 to generate an indication that the UV curing device 120 requires servicing to replace the defective LEDs before the printer can return to operational status.

Figure 6:
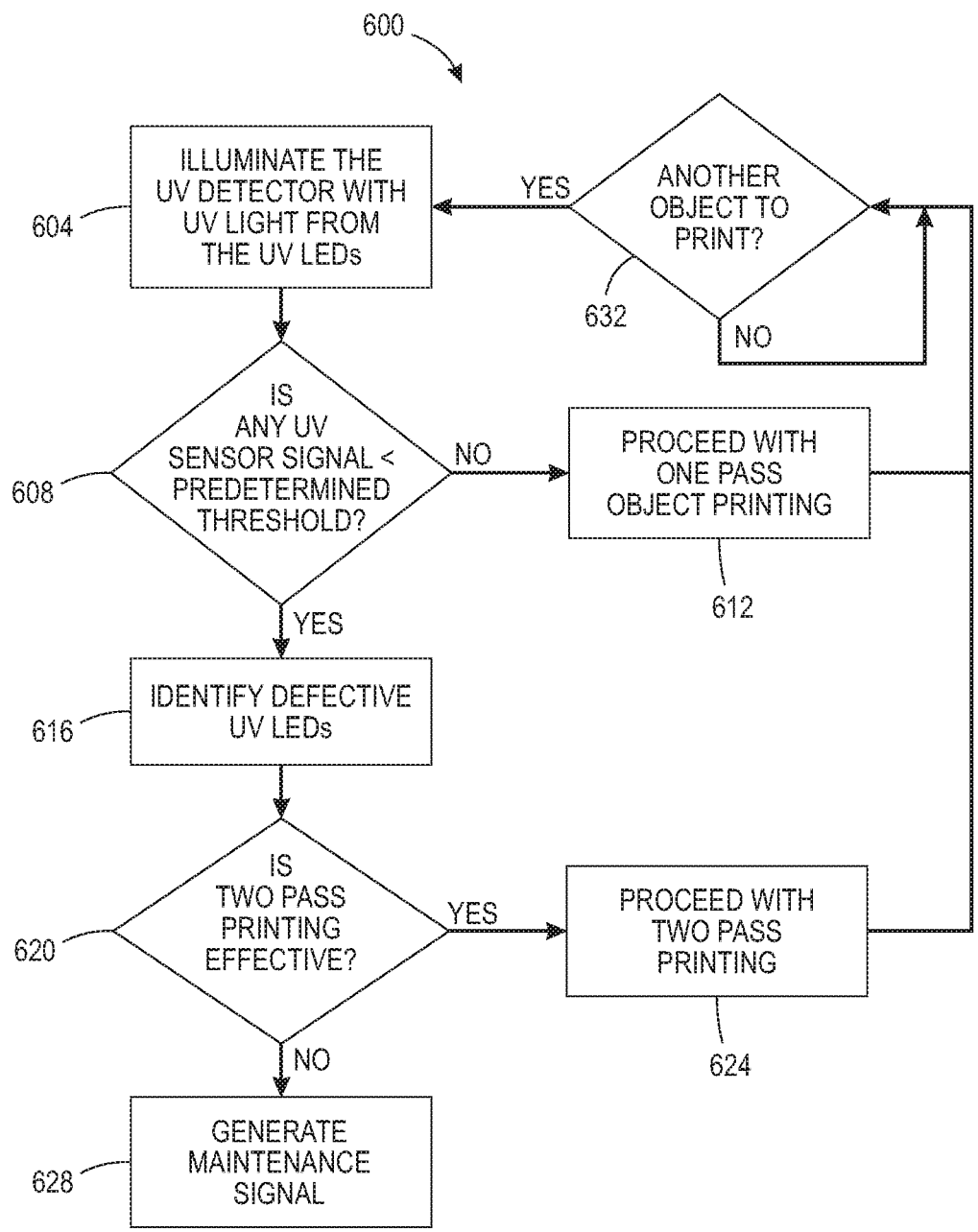
FIG. 6 is a flow diagram of a process that implements the adjustment operation depicted in FIG. 5.

A process for operating the printer 100 is shown in FIG. 6. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 124 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 6 is a flow diagram of a process that implements the adjustment operation depicted in FIG. 5. The process begins by operating the UV curing device 120 while the device is aligned with the UV sensors 308 in the UV detector 142 in an one-to-one correspondence (block 604). The controller 124 compares the output signal from each UV sensor to determine if all of the UV sensors are operating (block 608). If they are all operating, then the object is printed and a single pass by the UV curing device is sufficient to cure the UV ink printed on the object (block 612). If one or more defective LEDs are detected, the process identifies the defective UV LEDs (block 616) and determines whether the defective pattern can be addressed with a two-pass solution (block 620). If it can, an appropriate repositioning is performed between the two passes to implement two pass object printing (block 624). Otherwise, the controller generates an indication that the UV curing device requires servicing to replace defective LEDs (block 628). Once an object is printed by either one pass or two pass object printing, the process determines whether another object is to be printed (block 632) and if another object is ready for printing, the UV LEDs are checked before printing (blocks 604 and 608). Otherwise, the process waits until another object is ready to print.

Figure 7A:
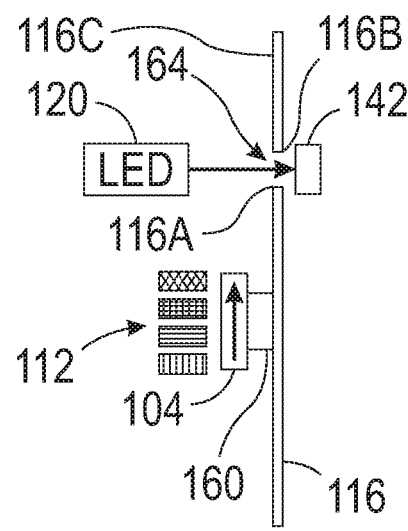
FIGS. 7A, 7B, 7C, and 7D depict alternative embodiments of the printer that enable the UV detector to receive UV light from the UV curing device for detecting defective UV sensors.
Figure 7B:
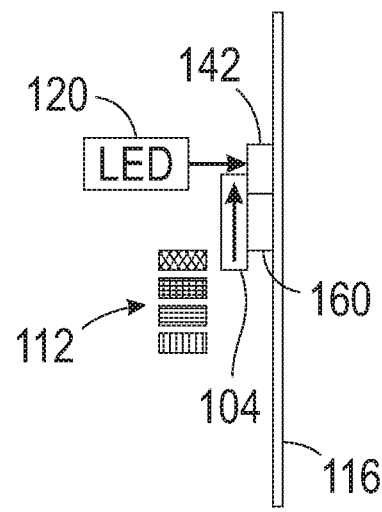
Figure 7C:
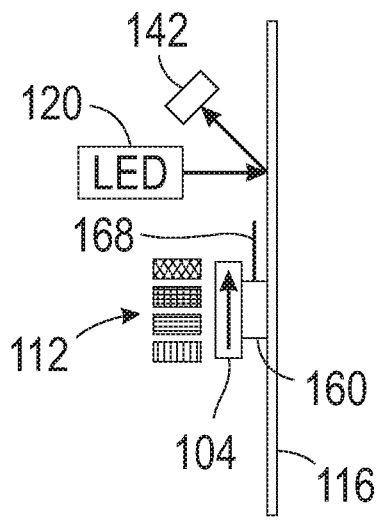
Figure 7D:
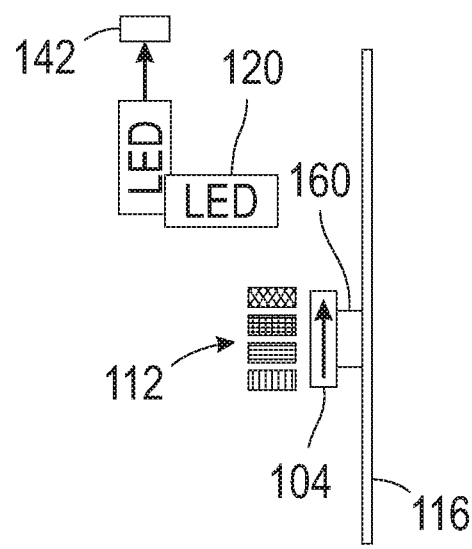

Different embodiments of the printer 100 are depicted that structure the components differently to enable the UV LEDs in the curing device to illuminate the UV sensors in the UV detector. In FIG. 7A, the holder 108 has a single sleeve 160 that receives the member 116. The sleeve 160 has a length that is greater than a gap distance between end 116A and end 116B of the member 116. This configuration enables the printhead array 112 to be positioned opposite the member 116, rather than offset from the member as described above. The gap distance enables the sleeve 160 to continue to the upper portion 116B so the UV curing device 120 can direct UV light onto the object 104. In FIG. 7B, the member 116 is continuous, but again the printhead array 112 is opposite the member 116, rather than being offset. Extending from the sleeve 160 is the UV detector 142. This configuration enables the UV detector to pass opposite the UV curing device 120 before the object passes by the UV curing device. Thus, the UV curing device directs light into the UV detector so the UV sensors in the UV detector generate signals that are processed by the controller 124 so the controller can identify any defective LEDs and determine whether a one pass or two pass printing process can be performed to cure the ink image on the object. In FIG. 7C, the member 116 is continuous, but again the printhead array 112 is opposite the member 116, rather than being offset. Additionally, the UV detector 142 is positioned at angle with reference to the member 116. A member 168 having a reflective surface extends from the sleeve 160. This reflective surface is tilted at an angle that enables UV light emitted by the UV curing device to be reflected into the UV detector. Again, this member 168 and its reflective surface enable defective UV LEDs to be identified and the feasibility of a one or two pass object printing process to be assessed before the object passes the UV curing device. In FIG. 7D, the member 116 is continuous, but again the printhead array 112 is opposite the member 116, rather than being offset. In this embodiment, the actuator 138 (FIG. 1) is further configured to rotate the UV curing device so it faces the UV detector 142, which is positioned on the same side of the member 116 as the UV curing device 120. When the controller 124 operates the actuator 138 to rotate the UV curing device 120, the UV curing device faces the UV detector to enable the identification of any defective LEDs and assess the feasibility of a one or two pass printing process. If object printing is possible, the controller 124 operates the actuator 138 to return the UV curing device to its original position to enable the curing of UV ink on the surface of the object.

It will be appreciated that variations of the above-disclosed apparatus and other features, and functions, or alternatives thereof, may be desirably combined into many other different systems or applications. For example, while the defective UV LED detector disclosed above has been described as being used in a DTO printer, the detector can also be used in printing systems that eject UV curable inks onto print media to form images on the media and then cure them. Various presently unforeseen or unanticipated alternatives, modifications, variations, or improvements therein may be subsequently made by those skilled in the art, which are also intended to be encompassed by the following claims.

What is claimed is:

1. A printing system comprising:
   a plurality of printheads fixedly positioned opposite a path of object movement past the plurality of printheads in a process direction, each printhead in the plurality of printheads being configured to eject marking material toward the object as the object passes the printheads in the process direction;
   an ultraviolet (UV) curing device having a plurality of UV light emitting diodes (LEDs), each UV LED in the UV curing device being configured to emit UV light, the UV curing device being fixedly positioned in the process direction at a location where the UV curing device cures UV marking material ejected onto the object after at least one of the printheads has ejected UV marking material onto a surface of the object and the object continues in the process direction past the plurality of printheads to a position opposite the UV curing device;
   an UV detector having a plurality of UV sensors, each UV sensor being configured to receive UV light from one of the UV LEDs in the UV curing device and generate an electrical signal corresponding to an intensity of the UV light received by the UV sensor;
   a first actuator operatively connected to the UV curing device; and
   a controller operatively connected to the plurality of printheads, the UV curing device, the first actuator, and the UV detector, the controller being configured to operate the UV curing device to direct UV light into the UV detector, to receive the electrical signals generated by the UV sensors in the UV detector, to identify any UV LED in the UV curing device that is not emitting UV light at a predetermined intensity or greater, to operate the first actuator to reposition the UV curing device in a cross-process direction by a width of UV light emitted by a single UV LED in the UV curing device and then operate another actuator to pass the object through the UV light emitted by the repositioned UV curing device so an operational UV LED in the UV curing device emits UV light onto an area of the object that was opposite a UV LED identified as not emitting UV light at the predetermined intensity or greater.

2. The printing system of claim 1 further comprising:
   a member having a first end and a second end, the plurality of printheads being fixedly positioned between the first end and the second end of the member;
   a holder configured to hold an object and to move along the member between the first end and the second end of the member;
   a second actuator operatively connected to the holder to enable the second actuator to move the holder along the member and move the object past the printheads to receive marking material from the printheads in the plurality of printheads;
   the UV curing device being fixedly positioned in the process direction between the plurality of printheads and the second end of the member so the UV curing device cures the UV marking material ejected onto the object after the object moving in the process direction passes the plurality of printheads; and
   the controller being operatively connected to the second actuator, the controller being further configured to operate the second actuator to move the holder and object along the member in a process direction so the plurality of printheads ejects the marking material onto the object as the object moving in the process direction passes the printheads in the plurality of printheads to the location opposite the UV curing device.

3. The printing system of claim 2, the controller being further configured to identify the UV LEDs not emitting UV light at the predetermined intensity or greater by comparing a voltage of each electrical signal received from the UV sensors in the UV detector to a predetermined voltage level that corresponds to the predetermined intensity.

4. The printing system of claim 1, the controller being further configured to operate the first actuator to move the UV curing device bidirectionally in the cross-process direction.

5. The printing system of claim 4, the UV detector further comprising:
   a housing; and
   a plurality of walls within the housing, each wall being positioned between adjacent UV sensors in the UV detector to block UV light from UV LEDs in the UV curing device that are not positioned directly opposite the UV sensors separated by one of the partitions.

6. The printing system of claim 5 wherein a number of UV LEDs in the UV curing device equals a number of UV sensors in the UV detector.

7. The printing system of claim 6 wherein the UV LEDs and UV sensors are arranged in the UV curing device and the UV detector, respectively, in a one-to-one correspondence.

8. The printing system of claim 6 further comprising:
   a voltage supply;
   an electrical switch operatively connected between the voltage supply and the UV curing device; and
   the controller being operatively connected to the electrical switch, the controller being further configured to operate the UV curing device by operating the electrical switch to couple the voltage supply to the UV curing device selectively.

9. The printing system of claim 2, the holder further comprising:
   a platen; and
   at least one sleeve that receives the member to enable the holder to slide along the member, the at least one sleeve being connected to a surface of the platen that is opposite a surface of the platen that faces the plurality of printheads and the UV curing device so the member and the platen of the holder pass opposite the plurality of printheads and the UV curing device.

10. The printing system of claim 9 wherein the member has an upper portion and a lower portion that are aligned vertically and separated from one another by a predetermined distance of separation, the predetermined distance of separation being less than a length of the at least one sleeve; and the UV curing device and the UV detector being opposite one another with the separation of the upper portion of the member and the lower portion of the member being interposed between the UV curing device and the UV detector.

11. A method of operating a printing system comprising:

operating an ultraviolet (UV) curing device with a controller to direct UV light into a UV detector, the UV curing device having a plurality of UV light emitting diodes (LEDs) and the UV detector having a plurality of UV sensors, each UV LED in the UV curing device being configured to emit UV light and each UV sensor being configured to receive UV light from one of the UV LEDs in the UV curing device and generate an electrical signal corresponding to an intensity of the UV light received by the UV sensor;

receiving with the controller electrical signals generated by the UV sensors in the UV detector;

identifying with the controller any UV LED in the UV curing device that is not emitting UV light at a predetermined intensity or greater; and operating an actuator with the controller to move the UV curing device in a cross-process direction by a predetermined distance that corresponds to a width of UV light emitted by a single UV LED in the UV curing device; and operating another actuator with the controller to move an object past the repositioned UV curing device so an operational UV LED in the UV curing device emits UV light onto an area of the object that was opposite a UV LED identified as not emitting UV light at the predetermined intensity or greater.

12. The method of claim 11, the identification of any UV LED as failing to emit UV light at the predetermined intensity or greater further comprising:

comparing a voltage of each electrical signal received from the UV sensors in the UV detector to a predetermined voltage level that corresponds to the predetermined intensity.

13. The method of claim 12 further comprising:

fixedly positioning the UV curing device in the process direction at a location so the UV curing device emits UV light onto the object after the object has received UV curable marking material from at least one printhead.

14. A printing system comprising:

a plurality of printheads fixedly positioned opposite a path of object movement past the plurality of printheads in a process direction, each printhead in the plurality of printheads being configured to eject marking material toward an object as the object passes the printheads;

a member having a first end and a second end, the plurality of printheads being fixedly positioned between the first end and the second end of the member, the member having an upper portion and a lower portion that are aligned vertically and separated from one another by a predetermined distance, the predetermined distance being less than a length of the at least one sleeve;

an ultraviolet (UV) curing device having a plurality of UV light emitting diodes (LEDs), each UV LED in the UV curing device being configured to emit UV light, the UV curing device being fixedly positioned in the process direction between the plurality of printheads and the second end of the member so the UV curing device cures UV marking material ejected onto the object after the object passes the plurality of printheads;

a holder having a platen and at least one sleeve connected to a surface of the platen that is opposite a surface of the platen that faces the plurality of printheads and the UV curing device, the platen being configured to hold an object and the at least one sleeve being configured to receive the member and slide along the member between the first end and the second end of the member so the platen of the holder passes opposite the plurality of printheads and the UV curing device;

an UV detector having a plurality of UV sensors, each UV sensor being configured to receive UV light from one of the UV LEDs in the UV detector and generate an electrical signal corresponding to an intensity of the UV light received by the UV sensor, the UV detector and the UV curing device being opposite one another with the separation between the upper portion of the member and the lower portion of the member being interposed between the UV curing device and the UV detector;

a first actuator operatively connected to the holder; and a controller operatively connected to the plurality of printheads, the UV curing device, the first actuator, and the UV detector, the controller being configured to operate the first actuator to move the holder and object along the member in a process direction, to operate the plurality of printheads to eject marking material onto the object as the object passes the printheads in the process direction, to operate the UV curing device to direct UV light into the UV detector, to receive the electrical signals generated by the UV sensors in the UV detector, and to identify any UV LED in the UV curing device that is not emitting UV light at a predetermined intensity or greater.

15. The printing system of claim 14, the UV detector further comprising:

a housing; and a plurality of walls within the housing, each wall being positioned between adjacent UV sensors in the UV detector to block UV light from UV LEDs in the UV curing device that are not positioned directly opposite the UV sensors separated by one of the partitions.

* * * * *